3,083,112
LIQUID LAUNDRY STARCH AND METHOD
OF PRODUCING SAME
James W. Evans and Glen E. Nelson, Highland, Ind., assignors to American Maize-Products Co., a corporation of Maine
No Drawing. Filed Oct. 21, 1959, Ser. No. 847,690
6 Claims. (Cl. 106—213)

This invention relates to a liquid laundry starch and method of producing same.

One of the major problems experienced with the liquid laundry starches on the market today is that there is a tendency for irreversible starch gels to form during shipment and storage. If the entire mass gels the product cannot be used. Partial gelation is also objectionable in that the gelled portions tend to streak clothing and stick to the iron. Winter adds to the problems. If the liquid laundry starch freezes and is later thawed out the thawed product contains fibrous and curdled portions of retrograded starch that cannot be redispersed and the thawed product will tend to streak clothing and stick to the iron.

We have now discovered that it is possible to make an exceptionally stable liquid laundry starch which in actual tests has shown no tendency to gel during shipment and storage and our liquid laundry starch has been frozen and thawed out without formation of objectionable fibrous and curdled portions of retrograded starch. These results were quite unexpectedly achieved by subjecting starch in aqueous slurry to the action of live steam at superatmospheric pressures and under controlled conditions of temperature. The starch is gelatinized during treatment and gelatinization is apparently carried out in such a way that the resulting liquid product has the exceptional stability to withstand freezing and thawing without any objectionable formation of fibrous and curdled portions of retrograded starch. The thawed product when used as a size showed no tendency to streak clothing or stick to the iron. The shelf life of the product of our invention is excellent and samples stored since December 1957 show no evidence of separation, gelling or spoilage to date.

Any of the commercially available natural starches such as corn, potato, wheat, sago and arrowroot starches may be employed in carrying out our invention. Modified starches such as the commercially available family of oxidized starches, ether starches, anionic and cationic starches, acid treated thin boiling starches, and dextrinized starches may also be employed. The starch is employed preferably in granular form, but if desired it may be pre-gelatinized. All of the previously described natural and modified starches are well known and readily available on the open market. Best results have been achieved with the commercially available family of oxidized starches and these are preferred. The selected starch is slurried in water in conventional manner. The amount of starch solids in the slurry for our purpose is in general from about 2.5 to 50% of starch solids based on the weight of water. Preferably we employ from about 12 to about 25% of starch solids.

Treating the aqueous starch slurry with live steam at superatmospheric pressures under controlled conditions of temperature is an extremely important and critical step for achieving the desired results in accordance with the present invention. The desired treatment is achieved by pumping a stream of starch slurry into a cooking chamber where it is commingled with steam at superatmospheric pressure. The flow of slurry through the chamber is preferably continuous and the rate of flow of the slurry and the pressure and temperature of the steam is controlled to establish a slurry temperature of about 190 to about 320° F. At superatmospheric pressure and within the specified range of temperature, treatment of the starch is completed in the matter of seconds and in our work on various types of starches treatment in the chamber did not exceed one minute. If desired, however, the starch slurry may be treated for periods of time in excess of one minute but this is not necessary.

The pressure in the cooking chamber must be above atmospheric pressure and depending on the particular chamber employed the gauge pressure may be 100 pounds per square inch or more. We have achieved best results with a gauge pressure of about 40 to 80 lbs. p.s.i. Steam must be supplied to the chamber at superatmospheric pressure and at a temperature to heat the starch slurry and maintain the temperature of the slurry during treatment within the range prescribed above.

The rate of flow of the slurry through the chamber will vary depending upon pump capacity and size of the chamber. With our equipment the rate of flow may be from about 1 to about 12 gallons of slurry per minute. But it will be understood that the rate of flow employed will depend upon the particular equipment at hand.

The starch slurry passes from the cooking chamber through a suitable opening to flash into the atmosphere above a collecting kettle which preferably contains cooling water mechanically agitated. The product discharged from the cooker is in the form of a thin fluid paste having the appearance of a clear solution.

In treating the starch in accordance with our invention we have achieved excellent results with a so-called jet type cooker which is readily available on the open market. This type of cooker is described in United States Patent No. 2,678,276.

In our development work we have achieved best results with a jet cooker of the type described in the aforementioned United States patent, having a cylindrical chamber about 24" in length and an internal diameter of about 4". One of the end plates of the chamber is provided with a conduit for the starch slurry which has an internal diameter of about ⅜". The conduit or pipe is positioned in the center of the end plate where it extends through the plate and into the chamber for a distance of about 5". A plurality of steam injection pipes are arranged in the end plate to surround the starch slurry conduit and the steam pipes pass through the end plate and extend into the cooker to terminate in the general area of the starch slurry conduit. In our cooker there are 4 steam pipes arranged symmetrically around the starch slurry pipe and these terminate respectively at 2, 4, 6 and 8" from the end plate within the chamber. The ends of the steam pipes are slightly bent in order to give the entering steam a swirling motion, but this is not necessary and the pipes may be positioned parallel to the axis of the chamber. The steam pipes each have an internal diameter of about ¼". An outlet pipe is positioned in the chamber in proximity to the second end plate as shown in the aforementioned U.S. patent. The outlet pipe is provided with a temperature gauge and pressure gauge for controlling the conditions of treatment. The outlet pipe is arranged to flash the product coming from the cooker into the atmosphere in a holding kettle above cooling water which is mechanically agitated as shown in the aforementioned U.S. patent.

The starch slurry to be treated may be made up in any convenient form of kettle and a conventional type pump is used for pumping the slurry through the cooker. The arrangement shown in the aforementioned U.S. patent may be employed.

It will be understood that the form of equipment described in a preferred form for treating the starch slurry in accordance with the present invention but other commercially available forms of cookers may be employed provided the equipment is adapted to subject starch in aqueous slurry to the action of live steam at superatmospheric pressure and under controlled conditions of temperature and to discharge the aqueous slurry into the atmosphere while superatmospheric pressure is maintained within the cooker. For example, the cooker need not be of the continuous type described and batch operation may be employed in a suitable kettle. In such case the starch slurry and steam may be injected upwardly through the bottom of the kettle and discharged within the kettle at a convenient level so that the starch and steam will commingle and fall to the bottom of the kettle for subsequent discharge into the atmosphere. It will also be understood that in the batch or continuous process the steam need not flow in the same direction as the starch slurry but it may be injected through the side of the chamber so that the jet of steam will intercept the stream of starch slurry at right angles and thereby achieve the desired commingling of steam and slurry for treatment. Alternatively the starch slurry and steam may be injected in countercurrent flow so that the starch slurry steam will meet head on. Other modified forms of apparatus will be obvious to those skilled in the art.

The starch solids in the final liquid product for shipment is preferably adjusted by adding water and other additives to provide a liquid laundry starch having from about 2.5 to about 20% of starch solids based on the weight of the liquid product. Preferably we employ about 6 to about 14% by weight of starch solids. In this connection it is to be noted that the starch slurry is maintained in liquid form throughout the process of the present invention and there is no need to dehydrate the starch slurry and then make up the final liquid product in aqueous form using dry starch solids.

Various additives may be incorporated into the final liquid laundry starch product such as preservatives, dyes, perfume, lubricants, whitening agents and borax or boric acid as is conventional in the art. These additives may be incorporated into the slurry either before or after treatment, but we prefer to incorporate the additives into the slurry before the treatment.

To improve the ironing properties of the starch product a lubricant is preferably added to the initial dispersion. The lubricant may be a wax derived from vegetable, animal or mineral sources such as carnauba, ouricury, palm, raffia, candelilla, sugar cane, Japan, esparto, shellac, bees, spermaceti, Chinese insect, montan and ozocerite waxes. Also petroleum waxes such as microcrystalline wax and paraffin and synthetic waxes such as chlorinated paraffins, chlorinated napthalenes, high molecular weight organic acids and alcohols, polyethylene, polyethylene glycols and high molecular weight esters of polyhydric alcohols may be used. These lubricants are well known and it is conventional to add them to liquid laundry starch.

We have discovered, however, that exceptional results are achieved with one particular lubricant which is identified as a solid water-soluble polyethylene product. This compound, sold under the trade name Carbowax is soluble in water and the extent of solubility will depend upon molecular weight. For example Carbowax 4000 is soluble in water up to 62% by weight of the water in which it is dissolved. Solubility of the wax enables us to avoid the problems of compatibility with the aqueous form of the final product which is a drawback to the ordinary type of lubricants now in use. The Carbowaxes which have been used with excellent results are Carbowax 4000, 6000 and 20,000. These numbers designate the average molecular weight of the wax.

In addition to waxes, semisolid lubricants such as petroleum jelly and liquid mineral oils may also be used as is conventional in the art. In all cases the selected lubricant is employed in conventional amounts of about 0.025 to about 0.25% by weight of liquid product.

If desired an optical chemical bleaching agent or so-called "whitening agent" can be added to the initial dispersion. These agents are organic dyes, dilute aqueous solutions which provide blue-white fluorescence in either daylight or ultraviolet light. They help to increase the brightness of white and colored fabrics when they are included in the laundry starch product. The agents may be those derived from coumarin such as $\beta$-methyl umbelliferone, 7-diethylamino-4-methylcoumarin, 7-diethanolamino-4-methylcoumarin, or from stilbene such as sodium 4,4'-bis(p-aminobenzamido) stilbene-2,2'-disulfonate, and tetrasodium 4,4'-bis(6-sulfo-2H-naphtho [1,2] triazol-2-yl) stilbene-2,2'-disulfonate. Examples of other suitable agents are disodium 4,5-bis(sulfophenyl)-4-imidazolin-2-one, 4-acetamido-N-n-butyl naphthalimide, and $\alpha,\beta$ - di - (2 - benzimidazolyl) ethylene. The "whitening agent" is used in conventional amounts of about 0.005 to about 0.01% by weight of liquid product.

We have found it desirable to add boric acid or borax to the initial dispersions when they are prepared with hydroxyethyl thin boiling or oxidized starches respectively. While it is not necessary to add the boric acid or borax to these starches it is definitely a fact that best results are achieved when boric acid or borax is added. It may well be that these compounds help to control the pH of the dispersion within some desirable range or to preserve the modified structure of the treated starch. Whatever the reason may be we recommend that the boric acid or borax be added in amounts ranging up to about 8.0% of the weight of starch solids in the slurry. If desired no borax or boric acid need be used.

Other ingredients such as preservatives, dyes and perfumes may be added as is conventional in the art. For example, small amounts of formaldehyde, metal salts of propionic acid, halogen compounds and phenols may be added to prevent the growth of bacteria and microorganisms. Water soluble dyes can be added to color the product. In this connection a blue color in the final product is highly desirable since it helps to increase the reflectivity of white fabrics treated with the starch product. Also, various perfumes can be added to give any desired pleasing odor to the product. The amount of reagents employed is conventional and may vary from about 0.1033 to about 0.313% based on the weight of liquid product.

The following examples illustrate the details of some preferred ways of carrying out the present invention. A description of the test procedures referred to in the examples is given after the last example. In all of the examples the jet cooker previously described above was employed and the specified pressure was the recorded gauge pressure.

EXAMPLE 1

25.0 lbs. of a thin boiling hydroxethyl starch, 1.25 lbs. of boric acid and 0.125 lb. of carbowax 4000 were slurried in 9 gal. of water. The temperature of the slurry was maintained at about 120° to 130° F. After thorough mixing the slurry was cooked in our jet cooker at chamber pressures of 65 to 70 lbs. p.s.i. and at a temperature of 270° to 280° F. The rate of flow of the slurry was 3 gals. per minute. The cooked slurry was discharged over the surface of 9 gals. of cool agitated water. After cooling to 80° F., 160 ml. of a 37% aqueous solution of formaldehyde was added to the product. The freeze-thaw stability of the product was excellent. The sediment reading after 16 hrs. was zero.

EXAMPLE 2

25.0 lbs. of oxidized corn starch, 0.125 lb. of Carbowax 4000 and 0.025 lb. of $\beta$-methyl umbelliferone were mixed in 9 gals. of water at 135° to 140° F. After thorough mixing the slurry was cooked in our cooker at chamber pressures of 75 to 80 p.s.i. and at a temperature of 270° to 300° F. The rate of cooking was initially 3 gals. per minute and then raised to 6 gals. per minute. The cooked slurry was discharged over the surface of 9 gals. of cool agitated water. After the product had cooled to 77° F., 119 ml. of a 37% aqueous solution of formaldehyde, 390 ml. of an aqueous blue dye solution, and 3 ml. of perfume were added. The freeze-thaw stability of the product was excellent and the sediment reading after 16 hours was zero.

EXAMPLE 3

12.5 lbs. of unmodified corn starch, 0.063 lb. of Carbowax 4000, and 0.063 lb. of calcium chloride were mixed in 10 gals. of water at 120° to 130° F. The mixture was then cooked in our jet cooker at a chamber pressure of 95 p.s.i. and at a temperature of 325° F. The cooked slurry was discharged over the surface of 9 gals. of cool agitated water. The freeze-thaw stability of the product was good and the sediment reading after 16 hours was negligible.

EXAMPLE 4

In this example the concentration of total starch solids in the final product was increased by adding ungelatinized starch which had not been treated in our jet cooker. This provides a so-called double strength liquid laundry starch. 25.0 lbs. of oxidized starch, 0.15 lb. of Carbowax 4000, and 0.036 lb. $\beta$-methyl umbelliferone were mixed in 9 gals. of water at 120° to 130° F. The mixture was cooked in our jet cooker at chamber pressures of 70 to 90 p.s.i. and at a temperature of 280° to 290° F. The cooked slurry was discharged over the surface of 8 gals. of cool agitated water. After this mixture had cooled to 110° F., 6.25 lbs. of a hydroxyethyl ungelatinized starch suspended in about 1 lb. of warm water was added. Then 163 ml. of a 37% aqueous solution of formaldehyde, blue dye and perfume were added and agitation was continued until the product had cooled to 80° F. The freeze-thaw stability of this product was excellent and the sediment reading after 16 hours was zero.

EXAMPLE 5

25.0 lbs. of oxidized starch, 0.125 lb. of Carbowax 4000, 0.25 lb. of borax, and 0.02 lb. of $\beta$-methyl umbelliferone were mixed in 9 gals. of water at 135° F. After thorough mixing, the slurry was cooked in our jet cooker at a chamber pressure of 50 p.s.i. and temperature of 270° F. The rate of cooking was initially 3 gals. per minute and then raised to 6 gals. per minute. The cooked slurry was discharged over the surface of 10 gals. of cool agitated water. After the product had cooled to 108° F., 119 ml. of a 37% aqueous solution of formaldehyde, 395 ml. of an aqueous blue dye solution, and 3 ml. of perfume were added. The freeze-thaw stability of the product was excellent and the sediment reading after 16 hours was zero.

EXAMPLE 6

25.0 lbs. of a hydroxyethyl thin boiling starch, 1.25 lbs. of boric acid, 0.125 lb. of Carbowax 4000, and 0.002 lb. of 7-diethylamino-4-methylcoumarin were mixed in 9 gals. of water at 120° to 130° F. The slurry is cooked by passing through the jet cooker at 270–280° F. After the product had cooled to 80° F., 119 ml. of a 37% aqueous solution of formaldehyde was added. The freeze-thaw stability of the product was excellent and the sediment reading after 16 hours was zero.

EXAMPLE 7

50.0 lbs. of oxidized corn starch, 0.5 lb. of borax, 0.5 lb. of petrolatum, and 0.04 lb. of $\beta$-methyl unbelliferone were mixed in 20.5 gals. of water at 120° F. The mixture was cooked in our jet cooker at a chamber pressure of 60 p.s.i. and at a temperature of 260° F. The rate of cooking was 3 gals. per minute. The cooked slurry was discharged over the surface of 21.0 gals. of cool agitated water. After the product had cooled to 86° F., 238 ml. of a 37% aqueous solution of formaldehyde, 790 ml. of an aqueous blue dye solution, and 6 ml. of perfume were added. The freeze-thaw stability of the product was excellent and the sediment reading after 16 hours was zero.

EXAMPLE 8

The procedure, ingredients and proportion of ingredients in Example 7 were repeated except that 0.25 lb. of Carbowax 4000 was used in place of the 0.5 lb. of petrolatum and the slurry was cooked at a rate of 6 gals. per minute instead of 3 gals. per minute.

The results were similar to those in Example 7.

Test Procedures

*Freeze-thaw stability.*—A sample of the liquid laundry starch is placed in a refrigerator at 15° F. for 16 to 24 hours until it is frozen into a solid cube. The cube is then allowed to melt in a beaker at room temperatures until it is fluid. The amount of non-dispersible fibrous and curdled portions of starch in the fluid sample is a measure of the product's low temperature stability. A satisfactory product should not show any appreciable fibrous and curdled portions of starch.

*Sediment reading.*—A sample of the liquid laundry starch product is diluted with water in the proportion of one part product to three parts water. 100 ml. of the diluted product is poured into a 100 ml. graduate and agitated by shaking the graduate several times. The graduate is allowed to stand for 16 hours at room temperatures and the volume of starch or starch paste that separates from the diluted product is read from the scale of the graduate. No appreciable separation should occur for a satisfactory product.

It will be understood that it is intended to cover all changes and modifications of the preferred embodiment of the invention herein chosen for the purpose of illustration which do not constitue departures from the spirit and scope of the invention.

What we claim is:

1. The method of producing liquid laundry starch in a pressure cooker having an inlet conduit for feeding an aqueous slurry of starch into a cooking zone of greater cross sectional area than said inlet conduit and an orifice for discharging aqueous starch liquid from said cooking zone which comprises the steps of forming an aqueous fluid slurry of starch which has from about 2.5 to about 50% starch solids based on the weight of water, pumping the aqueous starch slurry in a stream, feeding the stream of aqueous starch slurry into a cooking zone of greater cross sectional area than that of the said stream of aqueous starch slurry, maintaining said cooking zone at superatmospheric pressure between about 40 pounds per square inch gauge to about 100 pounds per square inch gauge by passing steam as superatmospheric pressure into said aqueous starch slurry in said cooking zone to commingle the steam and starch solids and raise the temperature of the slurry between about 190° and about 320° F., and then suddenly reducing the pressure and temperature of the starch liquid by discharging it from said cooking zone into atmospheric pressure to form an aqueous liquid laundry starch which when cooled to atmospheric temperature remains liquid without gelation.

2. The method of producing a liquid starch product in a pressure cooker having an inlet conduit for feeding an aqueous slurry of starch into a cooking zone of greater cross sectional area than said inlet conduit and an orifice for discharging aqueous starch liquid from said cooking zone which comprises the steps of forming an aqueous fluid slurry of starch which has from about 2.5 to about 50% starch solids based on the weight of water, pumping the aqueous starch slurry in a stream, feeding the stream of aqueous starch slurry into a cooking zone of greater cross sectional area than that of the said stream of aqueous starch slurry, maintaining said cooking zone at superatmospheric pressure between about 40 pounds per square inch gauge to about 100 pounds per square inch gauge by passing steam at superatmospheric pressure into said aqueous starch slurry in said cooking zone to commingle the steam and starch solids and raise the temperature of the slurry to between about 190° and about 320° F., and then suddenly reducing the pressure and temperature of the starch liquid by discharging it from said cooking zone into atmospheric pressure to form an aqueous liquid starch product which when cooled to atmospheric temperature remains liquid without gelation.

3. The method specified in claim 1 which includes the step of adding to the untreated starch slurry a reagent selected from the group consisting of borax and boric acid.

4. The product produced in accordance with the method of claim 1.

5. The method specified in claim 1 which includes the step of adding a water soluble polyethylene glycol as a lubricant to the untreated aqueous slurry of starch.

6. The method specified in claim 1 which includes the step of collecting the discharged heated slurry in water.

References Cited in the file of this patent

UNITED STATES PATENTS

| | | |
|---|---|---|
| 2,424,050 | Pecker | July 15, 1947 |
| 2,678,276 | North | May 11, 1954 |
| 2,702,755 | Chaney | Feb. 22, 1955 |
| 2,732,309 | Kerr | Jan. 24, 1956 |
| 2,783,167 | Lineberry et al. | Feb. 26, 1957 |
| 2,929,748 | Schwandt | Mar. 22, 1960 |